Patented Dec. 30, 1952

2,623,882

UNITED STATES PATENT OFFICE 2,623,882

PROCESS FOR THE MANUFACTURE OF ADDITION PRODUCTS OF HYDROCYANIC ACID AND ACRYLIC ACID NITRILE

Jules Meyer, Basel, Switzerland, assignor to Ciba Limited, Basel, Switzerland, a Swiss firm No Drawing. Application May 8, 1950, Serial No. 160,812. In Switzerland June 23, 1949

5 Claims. (Cl. 260—326.5)

It is known that the additive combination of hydrocyanic acid with acrylic acid nitrile can be brought about by reacting acrylic acid nitrile in aqueous solution with a water-soluble inorganic salt of hydrocyanic acid having an alkaline reaction, whereby succinimide is obtained as an addition product. However, this process is not very satisfactory because insufficient yields of succinimide are obtained.

The present invention is based on the observation that hydrocyanic acid can be additively combined with acrylic acid nitrile in very good yields by conducting the reaction of acrylic acid nitrile with a water-soluble inorganic salt of hydrocyanic acid having an alkaline reaction in the presence of a proportion of an acid such that the greater part of the hydroxide formed during the reaction is neutralized. Favorable yields are obtained by using one equivalent of the inorganic salt of hydrocyanic acid having an alkaline reaction with 0.5 to less than 1 equivalent of an acid. Especially favorable yields are obtained in the presence of 0.7–0.9 equivalent of an acid.

Advantageously, the process is carried out by running suitable proportions of acrylic acid nitrile and the acid simultaneously into an aqueous solution of the alkaline salt of hydrocyanic acid at a raised temperature. In this procedure the simplest course, when an organic acid is used, is to mix the acrylic acid nitrile with the acid before the nitrile is added to the salt of hydrocyanic acid, if the nitrile is soluble in the organic acid, and, when an inorganic acid is used, it is of advantage to run the nitrile and the acid separately into the solution of the salt of hydrocyanic acid. The reaction temperature is advantageously maintained above 40° C., but below 79° C. which is the boiling point of acrylic acid nitrile. Alternatively, the reaction may be carried out at a higher temperature, for example at 100° C., in a pressure vessel.

As reaction product there is obtained by the process of the invention a mixture consisting principally of succinic acid dinitrile and succinimide, the relative proportions of these substances depending on the reaction conditions used. The components may be isolated in known manner. Alternatively the resulting addition products may be hydrolyzed directly to succinic acid without being isolated.

As water-soluble inorganic salts of hydrocyanic acid having an alkaline reaction there may be used in the present process alkali metal cyanides such as sodium cyanide or potassium cyanide, or alkaline earth metal cyanides such as calcium cyanide, or finally ammonium cyanide. Owing to their good stability alkali metal cyanides are preferred for the purposes of the present invention.

For neutralizing the hydroxides formed during the reaction there may be used inorganic acids such as hydrochloric acid, sulphuric acid or phosphoric acid, or organic acids such as aryl or alkyl sulphonic acids, e. g. toluene sulphonic acid, naphthalene sulphonic acids, or sulphocarboxylic acids, e. g. m-sulphobenzoic acid, sulphoacetic acid, or preferably lower aliphatic carboxylic acids such as formic acid or acetic acid.

The yields of addition products obtainable by the process of the invention amount to approximately 90 per cent. of the theoretical yield calculated on the weight of the acrylic acid nitrile used.

The following examples illustrate the invention, the parts and percentages being by weight:

Example 1

A solution of 53 parts of acrylic acid nitrile in 45 parts of glacial acetic acid is introduced dropwise in the course of 1—1½ hours into a solution of 55 parts of sodium cyanide (90.5 per cent.) in 150 parts of water at 70° C. while stirring. When the addition is complete the reaction mixture is stirred for a few hours longer at the same temperature, whereupon two layers are formed. The upper layer consists of succinic acid dinitrile. The latter is separated, washed until neutral and distilled. The succinimide contained in the lower layers is isolated in known manner.

Alternatively, the resulting reaction mixture may be hydrolyzed directly to succinic acid without first isolating the components.

For this purpose the reaction mixture is run into 40 parts of water, 60 parts of pulverized sodium hydroxide are then slowly introduced, and the whole is heated at the boil while stirring in a reflux apparatus for 10 hours. The whole is then allowed to cool, the reaction mixture is diluted with 150 parts of water, and it is given a reaction strongly acid to Congo by the addition of a 4N-solution of sulphuric acid. In order to remove unchanged hydrocyanic acid the whole is finally heated at the boil for a further 4 hours, it is then cooled, and the succinic acid formed is isolated from the reaction mixture by extraction with ether. After distilling off the ether, there are obtained 106 parts of almost pure succinic acid melting at 182–184° C., which represents a yield of 89.8 per cent. calculated on the amount of acrylic acid nitrile used.

Alternatively the hydrolysis may be carried out in an acid medium. In this case 800 parts of sulphuric acid of 50 per cent. strength are run into the reaction mixture, the whole is heated at the boil in a reflux apparatus for 6 hours, then cooled and the resulting succinic acid is extracted with ether. In this manner there are obtained 104.1 parts of almost pure succinic acid melting at 182–184° C.

Instead of sodium cyanide there may be used for the reaction equivalent amounts of ammonium cyanide or calcium cyanide.

Example 2

53 parts of acrylic acid nitrile and 60 parts of phosphoric acid of 42.3 per cent. strength are run simultaneously in the course of 1—1½ hours into a solution of 55 parts of sodium cyanide (90.5 per cent.) in 150 parts of water at 50° C. while stirring. When the addition is complete the reaction mixture is stirred at 50° C. for a further 4–6 hours, and the reaction product is then worked up in the manner described in Example 1. By hydrolyzing the reaction mixture in an acid or alkaline medium there are obtained 104 parts of succinic acid melting at 182–184° C.

Instead of the phosphoric acid, there may be used for the reaction 87 parts of sulphuric acid of 48 per cent. strength, and then by acid hydrolysis there are obtained 106.7 parts of succinic acid melting at 182–183° C.

What I claim is:

1. A process for the manufacture of a mixture of succinimide and succinic acid dinitrile which comprises condensing at a temperature above 40° C. acrylic acid nitrile in aqueous solution with an equivalent proportion of an alkaline reacting water-soluble inorganic salt of hydrocyanic acid selected from the group consisting of alkali cyanides, ammonium cyanide and alkaline earth cyanides in the presence of 0.5 to less than 1 equivalent proportion of an acid which neutralizes the alkali hydroxide formed during the reaction.

2. A process for the manufacture of a mixture of succinimide and succinic acid dinitrile which comprises condensing at a temperature above 40° C. acrylic acid nitrile in aqueous solution with an equivalent proportion of sodium cyanide in the presence of 0.7–0.9 equivalent of sulphuric acid.

3. A process for the manufacture of a mixture of succinimide and succinic acid dinitrile which comprises condensing at a temperature above 40° C., acrylic acid nitrile in aqueous solution with an equivalent proportion of sodium cyanide in the presence of 0.7–0.9 equivalent of acetic acid.

4. A process according to claim 2, wherein 1 equivalent of acrylic acid nitrile and 0.7–0.9 equivalent of sulphuric acid are slowly run simultaneously into an aqueous solution of 1 equivalent of sodium cyanide at a temperature of 40–75° C.

5. A process according to claim 3, wherein a mixture of 1 equivalent of acrylic acid nitrile and 0.7–0.9 equivalent of acetic acid is slowly run into an aqueous solution of 1 equivalent of sodium cyanide at a temperature of 40–75° C.

JULES MEYER.

REFERENCES CITED

The following references are of record in the file of this patent:

UNITED STATES PATENTS

| Number | Name | Date |
|---|---|---|
| 2,434,606 | Carpenter | Jan. 13, 1948 |
| 2,481,580 | Dreyfus | Sept. 13, 1949 |

FOREIGN PATENTS

| Number | Country | Date |
|---|---|---|
| 707,852 | Germany | July 5, 1941 |
| 741,156 | Germany | of 1943 |